Nov. 21, 1933.　　　　H. W. ALDEN　　　　1,935,602
MOTOR VEHICLE
Filed Oct. 7, 1931　　　2 Sheets-Sheet 1
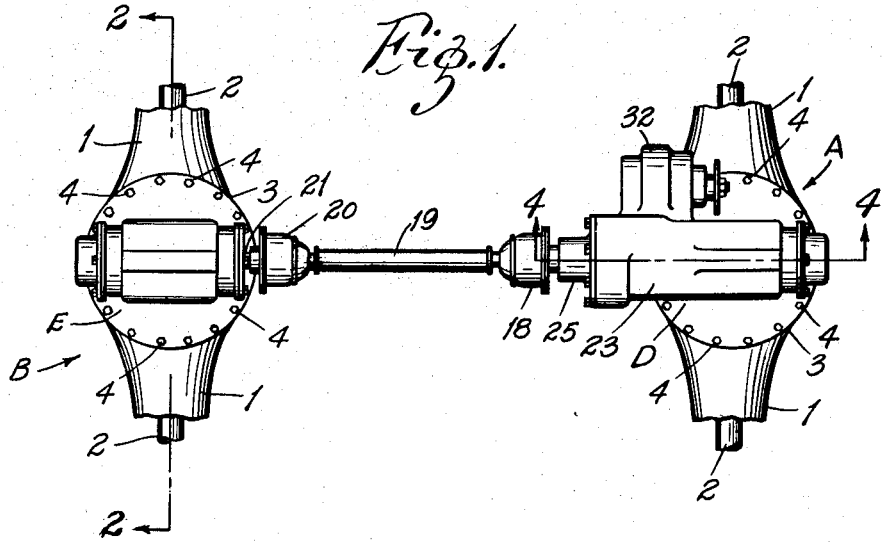
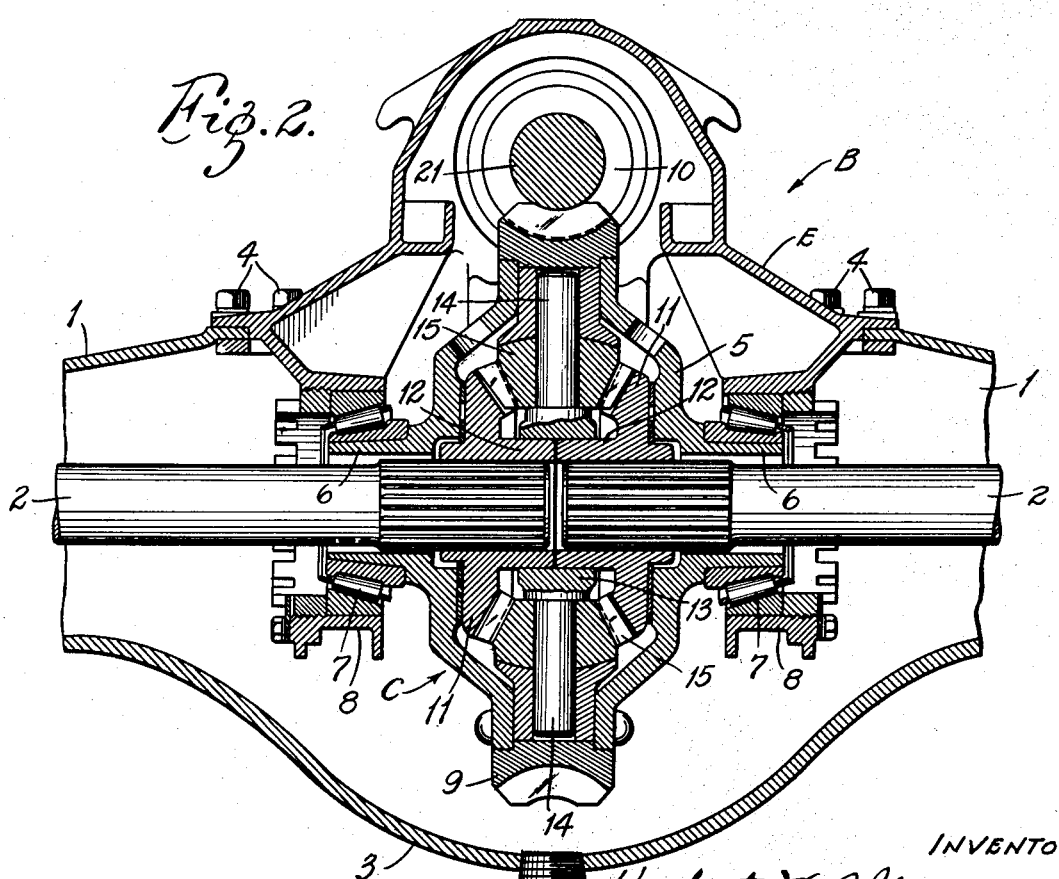
INVENTOR.
Herbert W. Alden
HIS ATTORNEYS

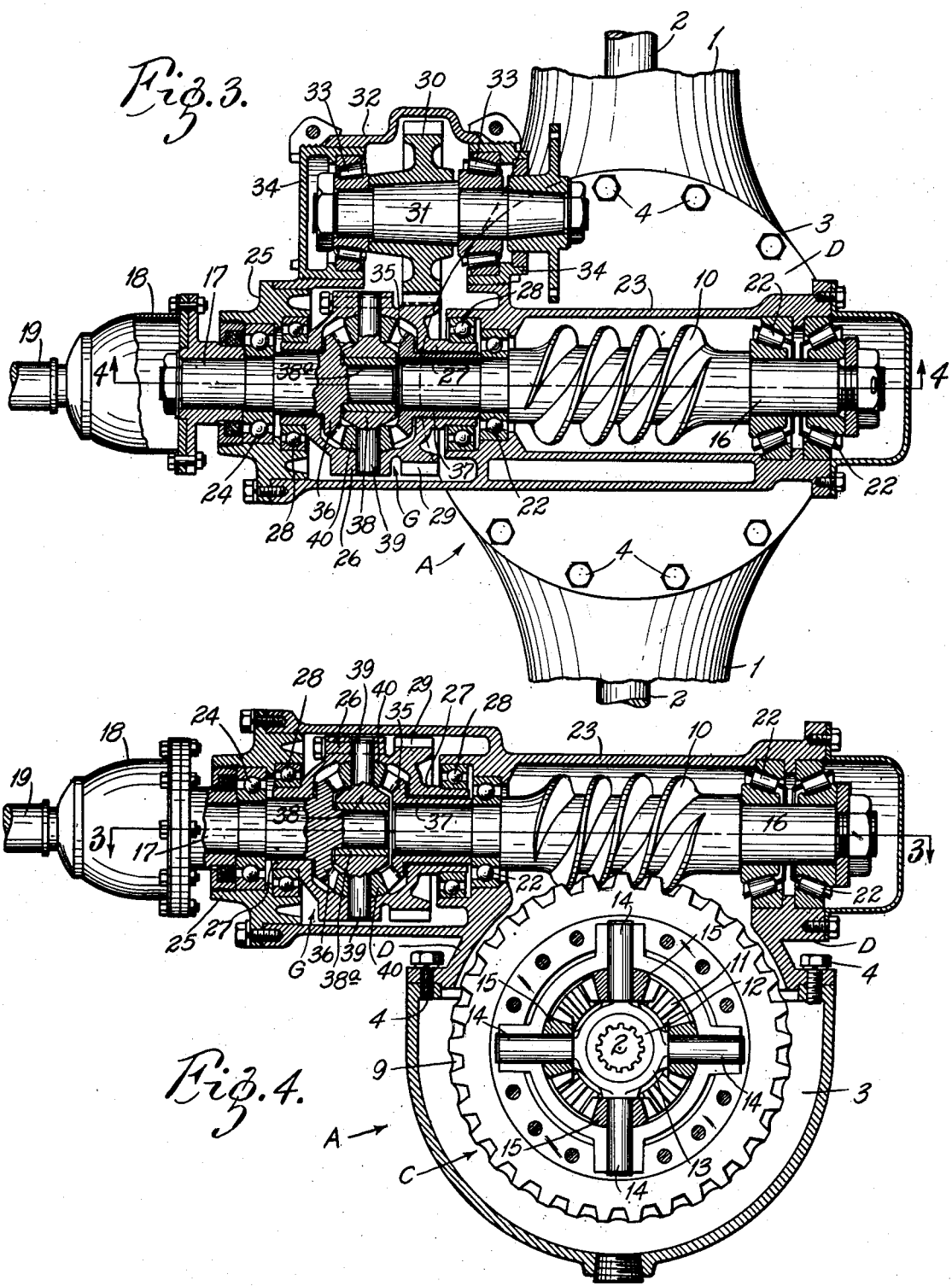

Patented Nov. 21, 1933

1,935,602

UNITED STATES PATENT OFFICE 1,935,602

MOTOR VEHICLE

Herbert W. Alden, Detroit, Mich., assignor to The Timken-Detroit Axle Company, Detroit, Mich., a corporation of Ohio Application October 7, 1931. Serial No. 567,359

6 Claims. (Cl. 180—22)

This invention relates to motor vehicles of the type having dual driving axle units comprising two differential driving axles that are differentially driven by means of an additional or third differential driving mechanism. Its principal objects are to provide a simple and efficient arrangement for compactly housing such additional or third differential driving mechanism in the removable differential gear carrier of one of the driving axles in line with the shafting that operatively connects the two driving axles, to provide proper bearings for said additional differential mechanism and the shafts associated therewith, and to provide for the ready removal and replacement of said differential mechanism. The invention consists in the construction, combinations and arrangements of parts hereinafter described and claimed.

In the accompanying drawings, which form part of this specification and wherein like symbols refer to like parts wherever they occur, Fig. 1 is a plan view of the middle portion of a dual driving axle unit embodying my invention, Fig. 2 is a vertical longitudinal section through the rear driving axle of said unit on the line 2—2 in Fig. 1, Fig. 3 is a horizontal section through the front driving axle on the line 3—3 in Fig. 4; and Fig. 4 is a vertical transverse section through the front driving axle on the lines 4—4 in Figs. 1 and 3.

Referring to the accompanying drawings, my invention is shown in connection with a dual driving axle unit of the kind used with six or eight wheeled motor vehicles. Said unit comprises two worm drive differential driving axles, one forward or through drive axle A and one rear or final drive axle B. Each of said driving axles comprises a load supporting housing, which has tubular end portions 1 adapted to receive the axle shaft sections 2 and an enlarged bowl or pot-shaped middle portion 3, forming a chamber adapted to receive a differential mechanism C through an opening provided therefor preferably in the top of said chamber. Gear carriers D and E are removably secured to the tops of the bowl-shaped middle portions 3 of the axle housings of the driving axles A and B, respectively, and enclose and support the differential mechanism C and the drive gearing therefor, the gear carriers covering the openings in the tops of said bowl-shaped middle portions of said housings and being provided with circular base flanges that rest on and are removably secured to said housings by cap screws 4.

The differential mechanism C for each driving axle is enclosed within a casing 5 having axially alined hubs 6 that are adapted to loosely receive the axle shaft sections 2. The differential casing 5 for each driving axle has its hubs 6 journaled in suitable bearings 7 provided therefor in split journal boxes 8 depending from the gear carrier of said driving axle, whereby the differential mechanism is removable with said carrier as a unit. Each differential gear casing 5 is provided with a worm gear 9 that is driven by a worm 10 located thereabove in the carrier therefor. The differential mechanism C enclosed within each differential gear casing comprises two opposed bevel side gears 11 which are splined on the inner ends of the axle shaft sections 2 of the axle. The two bevel side gears 11 have hubs 12 that extend towards each other and are journaled in a bearing provided therefor in a spider 13. The spider 13 has radially extending stub shafts 14 that rotate with the gear casing 5 and have bevel pinions 15 journaled thereon that intermesh with said side gears.

The differential gear carrier D for the forward or through drive axle A is provided with two axially alined propeller shaft sections 16 and 17, respectively, that extend transversely of said axle, the forward section 16 having the worm 10 thereon, which drives the differential gear casing of said axle. The rear propeller shaft section 17 of the forward axle has a universal joint connection 18 with the front end of a propeller shaft section 19 that extends rearwardly to the rear axle B and has a universal joint connection 20 at its rear end with the forward end of a propeller shaft section 21 that is journaled in the gear carrier E for said rear axle and has the worm 10 formed thereon that drives the differential gear casing supported in said carrier. The four propeller shaft sections 16, 17, 19 and 21 form a sectional propeller shaft that extends from axle to axle; while the universal joints 18 and 20 serve to maintain the sections that are journaled in the two axes substantially parallel under all road conditions. The propeller shaft section 16 in the front axle gear carrier D is mounted near its opposite ends in suitable anti-friction bearings 22 provided therefor in a housing 23 on the top of said carrier; and the other propeller shaft section 17 in said carrier is mounted intermediate the ends in a suitable bearing 24 seated in a closure ring 25 for closing the opening in the rear end of said housing.

The axially alined propeller shaft sections 16 and 17 mounted in the front axle gear carrier D are differentially driven by means of an additional or third differential driving mechanism G that is enclosed within a casing 26 having axially alined hubs 27 that are journaled in suitable bearings 28 seated respectively in the housing 23 and in the closure ring 25 for the rear end of said housing. The differential gear casing 26 is provided with a spur gear 29, which is driven by a spur pinion 30 fixed to a main drive shaft 31 that is disposed parallel with the propeller shaft sections 16 and 17 in a housing 32 that projects laterally from one side of the housing 23 which encloses said casing. Bearings 33 for the drive shaft 31 are mounted in closure members 34 for the shaft receiving openings at the ends of the housing 32. The forward end of the main drive shaft 31 extends through the closure member for the forward end of the housing 32 and is adapted to be connected with the usual change speed transmission gearing (not shown) to be driven thereby.

The third differential mechanism G enclosed within the front axle gear carrier D comprises two opposed bevel side gears 35 and 36 located within the gear casing 26 in axial alinement with the propeller shaft sections 16 and 17 in said carrier. The bevel side gear 35 has an elongated hub portion 37 that fits within the hub on the forward end of the differential gear casing 26 and is keyed or otherwise secured to the reduced rear end portion of the propeller shaft section 16. The other bevel side gear 36 of said third differential mechanism is preferably formed integral with the propeller shaft section 17 that extends through the rear hub of the differential casing. The forward end of the propeller shaft section 17 is rotatably supported in a plain bearing or bushing 38a provided therefor in the hub of a spider 38, which is disposed between two bevel side gears 35 and 36 of the differential and has radially extending stub shafts 39 that are anchored to the gear casing 26 and have bevel pinions 40 journaled thereon that intermesh with said bevel side gears to drive the same.

By the arrangement described, power delivered from the engine to the main drive shaft 31 is transmitted to the third differential mechanism G on the front driving axle A, which mechanism serves to differentially drive the differential mechanisms of the two driving axles through the sectional propeller shaft connecting said axles, thereby equalizing the driving, starting, stopping and braking torque on said axles and permitting the brakes on the wheels thereof to be adjusted independently of each other.

It is noted as an important advantage of my invention that it provides a straight through drive between the two axles for differentially driving them, which drive is obtained by means of a minimum number of parts all compactly arranged within the gear carrier for the front or through drive axle so as to be removable with the gear carrier as a unit as well as from the gear carrier itself. In practice, the main drive shaft may be alined with the engine and the sectional propeller shaft and differentials offset with respect to the transverse center line of the axles; or, if desired, the sectional propeller shaft and axle differentials may be located midway between the ends of the axles in line with the engine shaft and the main drive shaft offset with respect to the engine.

What I claim is:

1. A through drive differential driving axle comprising axle shaft sections, differential gearing operatively connecting said axle sections to drive the same, worm gearing operatively connected to said differential gearing to drive the same with the worm located above said mechanism, two axially alined propeller shaft sections extending transversely of said axle shaft sections above said differential gearing, one of said propeller shaft sections having said worm formed integral therewith and the other propeller shaft section being adapted to be connected to a third propeller shaft section leading to a final drive axle, differential gearing operatively connecting the adjacent ends of the two axially alined propeller shaft sections to drive the same, a main drive shaft extending parallel to said propeller shaft sections at one side thereof and operatively connected to said last mentioned differential gearing to drive the same, a load supporting housing for said axle shaft sections and said first mentioned differential gearing, and a carrier for said differential gearing, said propeller shaft sections and said main drive shaft being removably secured to said load supporting housing, the differential gearing for driving said propeller shaft sections including a casing having axially alined hubs, axially alined antifriction bearings mounted in said carrier for rotatably supporting said hubs, a spider secured to said casing and rotatably supporting one end of one of said propeller shaft sections, a bearing in said carrier for supporting the other end of said last mentioned propeller shaft section intermediate the ends thereof, a gear on said last mentioned propeller shaft section, a gear keyed to the adjacent end of the other propeller shaft section, and gears carried by said spider and meshing with the gears on said propeller shaft sections.

2. A through drive differential driving axle construction comprising axle shaft sections, differential gearing operatively connecting said axle sections to drive the same, worm gearing operatively connected to said differential gearing to drive the same, two axially alined propeller shaft sections extending transversely of said axle shaft sections one of said propeller shaft sections comprising a solid shaft having the worm of said worm gearing thereon and the other propeller shaft section being adapted to be connected to a third propeller shaft section leading to a final drive axle, differential gearing operatively connecting the adjacent ends of the two axially alined propeller shaft sections to drive the same, and a main drive shaft extending parallel to said propeller shaft sections at one side thereof and operatively connected to said last mentioned differential mechanism to drive the same, the differential gearing for driving said propeller shaft sections including a casing having axially alined hubs, axially alined antifriction bearings mounted in said axle for rotatably supporting said hubs, a spider secured to said casing and rotatably supporting one end of one of said propeller shaft sections, a bearing in said axle for supporting the other end of said last mentioned propeller shaft section, a gear on said last mentioned propeller shaft section, a gear mounted on the adjacent end of the other propeller shaft section for rotation therewith, and gears carried by said spider and meshing with the gears on said propeller shaft sections.

3. A through drive differential driving axle construction comprising an axle housing, a gear carrier removably secured to said housing, axially alined axle shaft sections in said housing, differential gearing supported in said carrier and operatively connecting said axle shaft sections to drive the same, axially alined forward and rear propeller shaft sections disposed above said differential gearing transverse to said axle shaft sections, a worm on the forward propeller shaft section operatively engaging said differential gearing to drive the same, the rear propeller shaft section being adapted to be operatively connected to a final drive axle to drive the latter, differential mechanism operatively connecting the adjacent ends of said propeller shaft sections to drive the same, a main drive shaft extending parallel to said propeller shaft sections and operatively connected to said differential mechanism to drive the same, said carrier being provided with a housing adapted to receive said differential mechanism and the rear propeller shaft section through an opening in said housing, a closure member for said opening, said differential mechanism comprising a casing having axially alined hubs adapted to receive the adjacent ends of said propeller shaft sections, bearings seated in said housing and in the closure member therefor for rotatably supporting the respective hubs of said casing, a bearing in said closure member for rotatably supporting said rear propeller shaft section, gears on the adjacent ends of said propeller shaft sections, a spider secured to said casing and having a bearing for supporting the inner end of said rear propeller shaft section, and gears on said spider intermeshing with the gears on the adjacent ends of said propeller shaft sections.

4. A dual driving axle unit comprising two differential driving axles, two propeller shaft sections mounted in one of said axles above and operatively connected to the differential gearing of the respective driving axles to drive said gearing, differential gearing mounted in said axle and operatively connected to the adjacent ends of the two propeller shaft sections therein for differentially driving said sections, and a drive shaft mounted in said axle alongside and substantially in the plane of said propeller shaft sections, said drive shaft being adapted to be connected to a source of driving power and being operatively connected to said last mentioned differential gearing to drive the same said drive shaft being mounted on the side of said axle nearest the other axle.

5. A dual driving axle unit comprising two differential driving axles, two propeller sections mounted in the forward axle and operatively connected respectively to the differential gearing of the two axles to drive the same, differential mechanism mounted in said forward axle and operatively connected to the adjacent ends of the propeller shaft sections therein for differentially driving said sections, a drive shaft mounted in said forward axle rearward of the axis thereof and alongside and substantially in the horizontal plane of said propeller shaft sections and operatively connected to said differential mechanism to drive the same, said differential mechanism comprising a casing having axially alined hubs journaled in said forward axle, a spider secured to said casing and rotatably supporting one end of one of said propeller shaft sections, a bearing in said axle for supporting the other end of said last mentioned propeller shaft section, a gear on said last mentioned propeller shaft section, a gear fixed to the adjacent end of the other propeller shaft section, and gears carried by said spider and meshing with the hereinbefore mentioned gears to drive the same.

6. A dual driving axle unit comprising two differential driving axles, two propeller sections mounted in the forward axle and operatively connected respectively to the differential gearing of the two axles to drive the same, differential mechanism mounted in said forward axle and operatively connected to the adjacent ends of the propeller shaft sections therein for differentially driving said sections, a main drive shaft mounted in said axle alongside and substantially in the horizontal plane of said propeller shaft sections and operatively connected to said differential mechanism to drive the same, said differential mechanism and said drive shaft being positioned rearward of the axis of the forward axle said differential mechanism comprising a casing having axially alined hubs journaled in said axle, a spider secured to said casing and rotatably supporting one end of one of said propeller shaft sections, a bearing in said axle for supporting the other end of said last mentioned propeller shaft section, a gear on said last mentioned propeller shaft section, a gear fixed to the adjacent end of the other propeller shaft section, gears carried by said spider and meshing with the hereinbefore mentioned gears to drive the same, a spur gear on said differential casing and a spur gear on said main drive shaft intermeshing with the spur gear on said differential casing to drive the same.

HERBERT W. ALDEN.